US012391050B2

(12) United States Patent
Boucher et al.

(10) Patent No.: US 12,391,050 B2
(45) Date of Patent: Aug. 19, 2025

(54) INK CARTRIDGE INK AMOUNT CALCULATIONS BASED ON MOTOR CHARACTERISTICS

(71) Applicant: Hewlett-Packard Development Company, L.P., Spring, TX (US)

(72) Inventors: Peter Boucher, Vancouver, WA (US); Michael Ewe, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 202 days.

(21) Appl. No.: 18/027,487

(22) PCT Filed: Sep. 30, 2020

(86) PCT No.: PCT/US2020/053614

§ 371 (c)(1),
(2) Date: Mar. 21, 2023

(87) PCT Pub. No.: WO2022/071948

PCT Pub. Date: Apr. 7, 2022

(65) Prior Publication Data

US 2023/0373219 A1 Nov. 23, 2023

(51) Int. Cl.
*B41J 2/175* (2006.01)

(52) U.S. Cl.
CPC .................................. *B41J 2/17566* (2013.01)

(58) Field of Classification Search
CPC .......... B41J 2/17566; B41J 2002/17569; B41J 2002/17589; B41J 29/38; B41J 29/393; B41J 19/202; B29C 64/393; B33Y 50/02
See application file for complete search history.

(56) References Cited

U.S. PATENT DOCUMENTS

| | | | | |
|---|---|---|---|---|
| 7,458,669 | B2 | 12/2008 | Jones et al. | |
| 8,764,144 | B2 | 7/2014 | Kim et al. | |
| 8,807,695 | B1 | 8/2014 | Mantell et al. | |
| 9,156,273 | B2 * | 10/2015 | Ejiri | B41J 2/17566 |
| 2002/0075340 | A1 | 6/2002 | Moriyama | |
| 2002/0163568 | A1 * | 11/2002 | Takeishi | B41J 29/38 347/101 |

(Continued)

FOREIGN PATENT DOCUMENTS

| | | | |
|---|---|---|---|
| JP | 2002137413 A | * | 5/2002 |
| JP | 2006-159576 A | | 6/2006 |

*Primary Examiner* — John Zimmermann
(74) *Attorney, Agent, or Firm* — Brooks, Cameron & Huebsch, PLLC

(57) ABSTRACT

According to examples, an apparatus may include a processor and a memory on which are stored computer-readable instructions that, when executed by the processor, may cause the processor to access a characteristic of a motor coupled to a carriage in a printer. In this regard, an ink cartridge may be mounted on the carriage and the characteristic may be of the motor during movement by the motor of the carriage. The processor may calculate an amount of ink in the ink cartridge based on the characteristic of the motor and may determine whether the calculated amount of ink differs from an estimated amount of ink in the ink cartridge. In some examples, based on the amount of ink in the ink cartridge differing from the estimated amount of ink in the ink cartridge, the processor may disable the printer and/or generate a notification.

17 Claims, 4 Drawing Sheets

(56) References Cited

U.S. PATENT DOCUMENTS

| | | | |
|---|---|---|---|
| 2004/0004645 | A1 | 1/2004 | Kanda et al. |
| 2007/0263020 | A1* | 11/2007 | Bradford .............. B41J 2/17596 347/7 |
| 2010/0177333 | A1 | 7/2010 | Nakagaki |
| 2013/0278663 | A1 | 10/2013 | Sugimoto et al. |
| 2018/0024524 | A1* | 1/2018 | Ewe ..................... G05B 19/232 347/14 |
| 2019/0016056 | A1 | 1/2019 | Tsukahara et al. |
| 2022/0379641 | A1* | 12/2022 | Sato ........................... B41J 2/14 |

* cited by examiner

METHOD
300

INK CARTRIDGE INK AMOUNT CALCULATIONS BASED ON MOTOR CHARACTERISTICS

BACKGROUND

Printers, such as inkjet printers, may include ink cartridges. The ink cartridges may be mounted on a carriage, which may be moved across a print media by a motor during printing operations in which the ink cartridges may be deposited onto the print media.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
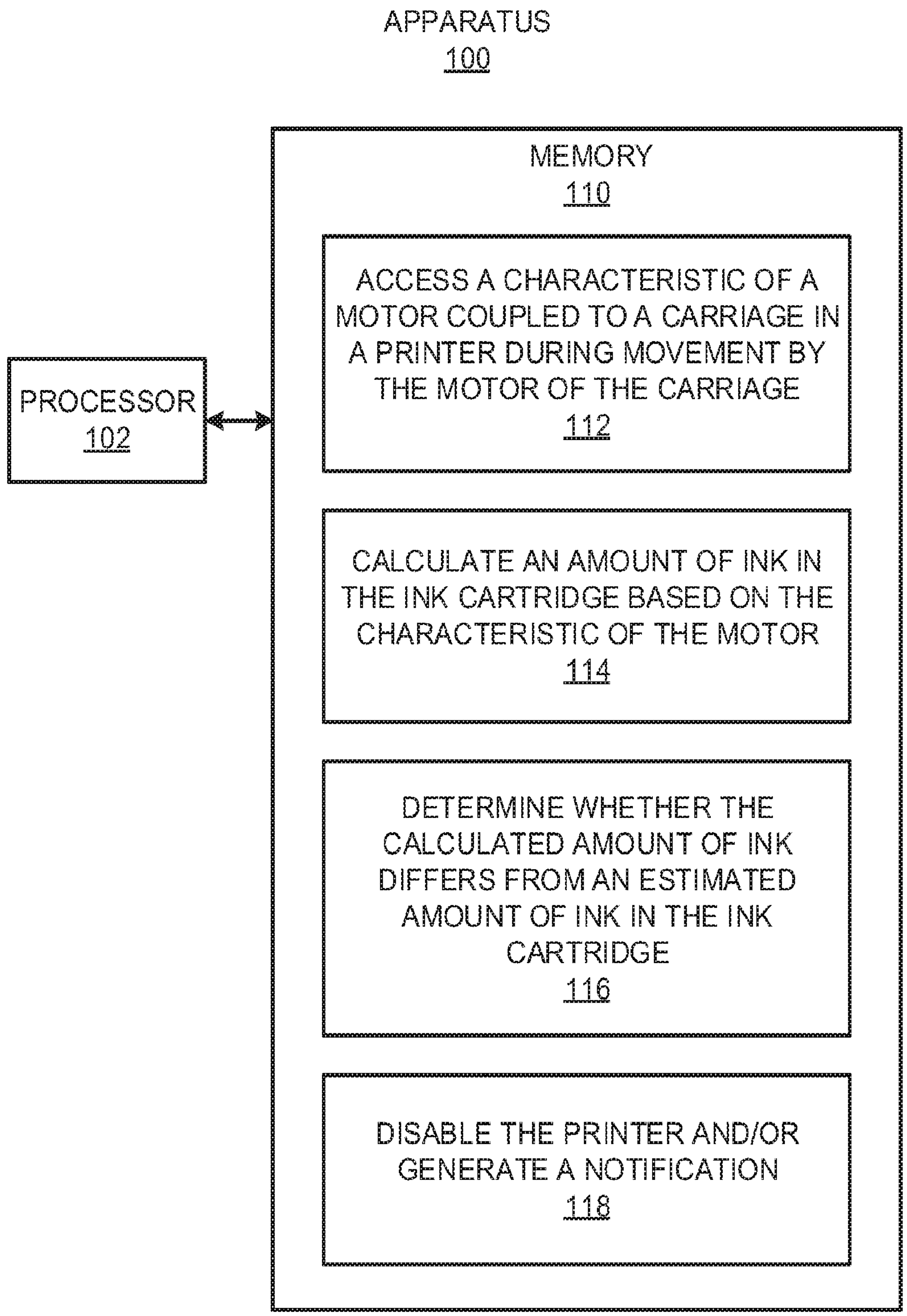
FIG. 1 depicts a block diagram of an example apparatus that may calculate an amount of ink in an ink cartridge based on a characteristic of a motor.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Printers, such as inkjet printers, may include a carriage that may support an ink cartridge, such as a one-time fill type ink cartridge. In some examples, the level of ink in the ink cartridge may be estimated, for instance, by tracking printer use. In some examples, a number of printed drops fired from the ink cartridge may be counted and a corresponding amount of ink used may be estimated based on the number of drops fired. However, in some cases, a concern with estimating an ink level in an ink cartridge may be that the estimation may assume that the ink cartridge has not been modified or tampered with, for instance, by adding ink into the ink cartridge, by adding a continuous ink supply into the ink cartridge, and/or the like. In some instances, the addition of ink into the ink cartridge may violate terms of an agreement that a user may have with a supplier of the ink cartridge.

Disclosed herein are apparatuses, systems, methods, and computer-readable media in which a processor may calculate an ink level or an amount of ink in an ink cartridge using, for instance, a motor-based calculation of the mass and/or weight of the ink cartridge. In some printers, an electric motor under feedback control may control the movement of a carriage upon which the ink cartridge is mounted by, for instance, a servo that may include a motor for precise control of angular and/or linear motion/position and sensors to enable feedback control. As the ink cartridge empties, the mass of the feedback controlled carriage may change, and a calibration algorithm in firmware may detect that change in mass through use of characteristics of the motor while the motor is moving the carriage. The processor may use the calculated difference in mass to calculate the amount of ink in the ink cartridge.

In some examples, the amount of ink calculated to be in the ink cartridge using the mass of the ink cartridge may be compared against another method of estimating the amount of ink in the ink cartridge. In some examples, the calculated amount of ink may be compared against an estimation of the amount of ink in the ink cartridge based on a number of drops of ink fired from the ink cartridge. In some examples, when the two values do not agree beyond a predefined difference level, the processor may determine, for instance, that the ink cartridge has been tampered with, and may disable the printer and/or generate a notification.

By enabling a determination of ink levels using motor characteristics as discussed in the present disclosure, ink level estimations may be based on actual hardware present in the printer, which may be more accurate than other methods of tracking and estimating ink levels. For instance, the determination of ink levels as discussed in the present disclosure may, for instance, be more accurate than methods that count a number of drops of ink fired from the ink cartridge. In some instances, the processor may more reliably determine whether an ink cartridge has been tampered with, for instance, to add ink to the ink cartridge, since the calculated amount of ink is based on actual measurements of the ink cartridge. In this regard, the processor may more reliably take remedial action, including disabling the printer and/or sending a notification to the user. Furthermore, the features of the present disclosure may be implemented in firmware, which may be less costly and simpler to manufacture than other solutions based on hardware modifications for determining tampering and/or modification of the ink cartridge hardware, for instance, hardware modifications to add features to ink cartridges to determine how much ink is present in the ink cartridges.

Figure 2:
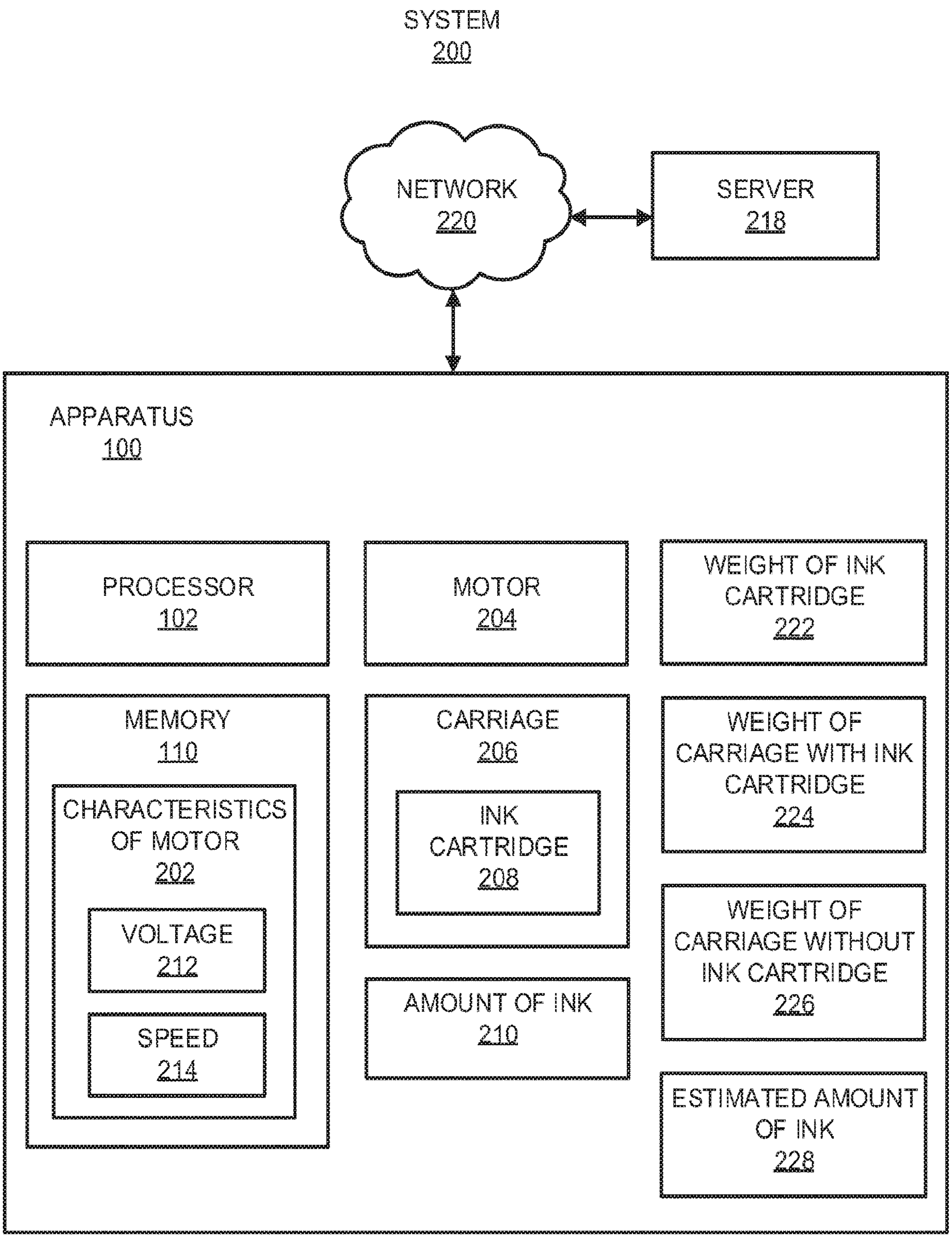
FIG. 2 shows a block diagram of an example system within which the example apparatus depicted in FIG. 1 may be implemented.

Reference is first made to FIGS. 1 and 2. FIG. 1 shows a block diagram of an example apparatus 100 that may calculate an amount of ink in an ink cartridge based on a characteristic of a motor. FIG. 2 shows a block diagram of an example system 200 within which the example apparatus 100 depicted in FIG. 1 may be implemented. It should be understood that the apparatus 100 depicted in FIG. 1 and/or the system 200 depicted in FIG. 2 may include additional features and that some of the features described herein may be removed and/or modified without departing from the scopes of the apparatus 100 and/or the system 200.

In some examples, the apparatus 100 may be implemented in a printer, such as a thermal inkjet printer, a piezoelectric inkjet printer, or the like. As shown, the apparatus 100 may include a processor 102 and a non-transitory computer-readable medium, e.g., a memory 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100 and/or system 200. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-118 to calculate an amount of ink in an ink cartridge based on a characteristic of a motor. The instructions 112-118 may be computer-readable instructions, e.g., non-transitory computer-readable instructions. In other examples, the apparatus 100 may include hardware logic blocks or a combination of instructions and hardware logic blocks to implement or execute functions corresponding to the instructions 112-118.

The processor 102 may fetch, decode, and execute the instructions 112 to access a characteristic 202 of a motor 204 coupled to a carriage 206 in the apparatus 100. In some examples, an ink cartridge 208 may be mounted on the carriage 206 and the motor 204 may control movement of the carriage 206, and thus movement of the ink cartridge 208, over a print media. The characteristic 202 of the motor 204 may be a characteristic that may be determined during movement by the motor 204 of the carriage 206. In some examples, the characteristic 202 may be used to calculate a weight of the carriage 206, which in turn may be used to calculate a weight of the ink cartridge 208, and which in turn may be used to calculate a weight of the ink stored in the ink cartridge 208 as the volume of ink in the ink cartridge 208 may change over time.

By way of particular example and for purposes of illustration, the ink cartridge 208 may be mounted on the carriage 206, which may be moved linearly across the apparatus 100 by an electric motor, such as the motor 204 as depicted in FIG. 2, under feedback control. In this example, the motor 204 may be connected to the carriage 206 through a pulley (not shown) that drives a belt (not shown), which may be connected directly to the carriage 206. The processor 102 may calculate an estimation of an inertia of the carriage 206 by determining an amount of motor torque used to accelerate the carriage 206 at a given rate.

In some examples, the characteristic 202 of the motor 204 may include a motor voltage level 212, a motor speed 214, a motor current, a motor torque constant, a motor resistance measured during movement by the motor 204 of the carriage 206, and/or the like. In this regard, the motor torque may be an estimation based on the motor voltage level 212 and the motor speed 214.

By way of particular example and for purposes of illustration, when a resistance (R) and a reactance (X) of the motor 204 are known, an overall impedance (Z) of the motor 204 at different motor speeds 214 (speed) may be calculated by:

$$Z=\sqrt{(R^2+(X*\text{speed})^2}\qquad \text{Equation 1}$$

In some examples, the motor current may be calculated as:

$$I=\frac{(V_{in}-V_{bemf})}{Z}\qquad \text{Equation 2}$$

where:

$$V_{bemf}=k_e*\text{speed}\qquad \text{Equation 3}$$

In this instance, $V_{in}$ may be the motor voltage level 212 and $k_e$ may be a back-electromotive force (back EMF) constant of the motor 204.

Once current I is known, the motor torque (Trq) may be calculated using the motor torque constant, $k_t$: based on:

$$Trp=k_t*I\qquad \text{Equation 4}$$

In this regard, the processor 102 may estimate the inertia of the carriage 206 based on an amount of the motor torque (Trq) used to accelerate the carriage 206 at a given rate, and subtracting a torque due to friction. In some examples, the amount of torque due to friction may vary linearly to motor speeds 214, and as such, the processor 102 may run the motor 204 at, for instance, three different speeds and may capture an amount of motor torque (Trq) to run at a steady state velocity for each of the three different speeds. In some examples, a relationship between velocity and friction may be calculated by taking a least square regression of the three different speeds. As such, the processor 102 may calculate a weight of the carriage 206 based on characteristics 202 of the motor 204 including, for instance, the motor voltage level 212 and the motor speed 214.

As depicted in FIG. 2, the system 200 may include a server 218 with which the apparatus 100 may be in communication via a network 220. In some examples, the characteristics 202 of the motor 204 may be stored in the memory 110 on the apparatus 100, on the server 218 connected over the network 220, and/or the like. In some examples, the characteristics 202 of the motor 204, including the resistance (R) of the motor 204, the reactance (X) of the motor 204, the back EMF constant, the motor voltage level 212, and/or the motor speed 214 may be measured during operation of the motor 204, and in some instances, may be stored on the memory 110, on the server 218, and/or the like.

In some examples, the processor 102 may adjust the characteristics 202 of the motor 204 based on changes in temperature of the motor, for instance, changes in resistance (R) of the motor 204 based on changes in temperatures of the windings of the motor 204. In this regard, a relationship between the motor current, the motor torque (Trq), and thermal characteristics of the motor 204 may be defined to improve accuracy, and modified characteristics 202 of the motor 204 reflecting this relationship may be user-defined, based on testing/experimentation on the motor 204, prior knowledge, and/or the like.

The processor 102 may fetch, decode, and execute the instructions 114 to calculate an amount (e.g., volume) of ink 210 in the ink cartridge 208 based on the characteristics 202 of the motor 204. In some examples, the processor 102 may calculate a weight 222 of the ink cartridge 208 based on a difference between a calculated weight 224 of the carriage 206 with the ink cartridge 208 and a calculated weight 226 of the carriage 206 without the ink cartridge 208. The processor 102 may calculate the amount of ink 210 currently in the ink cartridge 208 based on the determined weight 222 of the ink cartridge 208, for instance, based on a difference between the determined weight 222 of the ink cartridge 208 and a known weight of an empty ink cartridge 208.

In some examples, the processor 102 may calculate the weight 226 of the carriage 206 without the ink cartridge 208 during an initial calibration of the apparatus 100. In some instances, the weight 226 of the carriage 206 without the ink cartridge 208 may be stored in the memory 110 or at the server 218, and may be accessed by the processor 102 to calculate the amount of ink 210.

In some examples, the processor 102 may periodically calculate the weight 224 of the carriage with the ink cartridge 208 based on the characteristic 202 of the motor 204. The processor 102 may periodically calculate the amount of ink 210 in the ink cartridge 208 based on a difference between the calculated weight 226 of the carriage 206 without the ink cartridge 208 and the periodically calculated weight 224 of the carriage 206 with the ink cartridge 208. As such, the processor 102 may calculate a real-time value of the amount of ink 210 in the ink cartridge 208 based on the characteristic 202 of the motor 204.

The processor 102 may fetch, decode, and execute the instructions 116 to determine whether the calculated amount of ink 210 differs from an estimated amount of ink 228 in the ink cartridge 208. The processor 102 may calculate the estimated amount of ink 228, or in some instances, the processor 102 may access stored values of the estimated amount of ink 228 from the memory 110, the server 218, and/or the like. The processor 102 may compare the calculated amount of ink 210 in the ink cartridge 208 with the estimated amount of ink 228 in the ink cartridge 208.

In some examples, the estimated amount of ink 228 may be based on a number of drops fired from the ink cartridge 208 from a certain point, for instance when the ink cartridge 208 is full, and a known weight per drop of ink. In some examples, the processor 102 may track the number of drops fired from the ink cartridge 208. Alternatively or additionally, the number of drops fired from the ink cartridge 208 may be monitored and stored by another device, for instance, by the server 218.

The processor 102 may fetch, decode, and execute the instructions 118 to disable the printer and/or generate a notification based on the amount of ink 210 in the ink cartridge 208 differing from the estimated amount of ink 228 in the ink cartridge 208, for instance, by a predefined difference level. The predefined difference level may be determined through testing, modeling, prior knowledge, and/or the like. By way of particular example and for purposes of illustration, the processor 102 may determine that the ink cartridge 208 has been tampered with or altered, for instance, through addition of more ink and/or through modification of the ink cartridge 208 such that the ink cartridge 208 is connected to a continuous ink supply, in cases where the calculated amount of ink 210 is different than the estimated amount of ink 228 by a predetermined amount or more.

Figure 3:
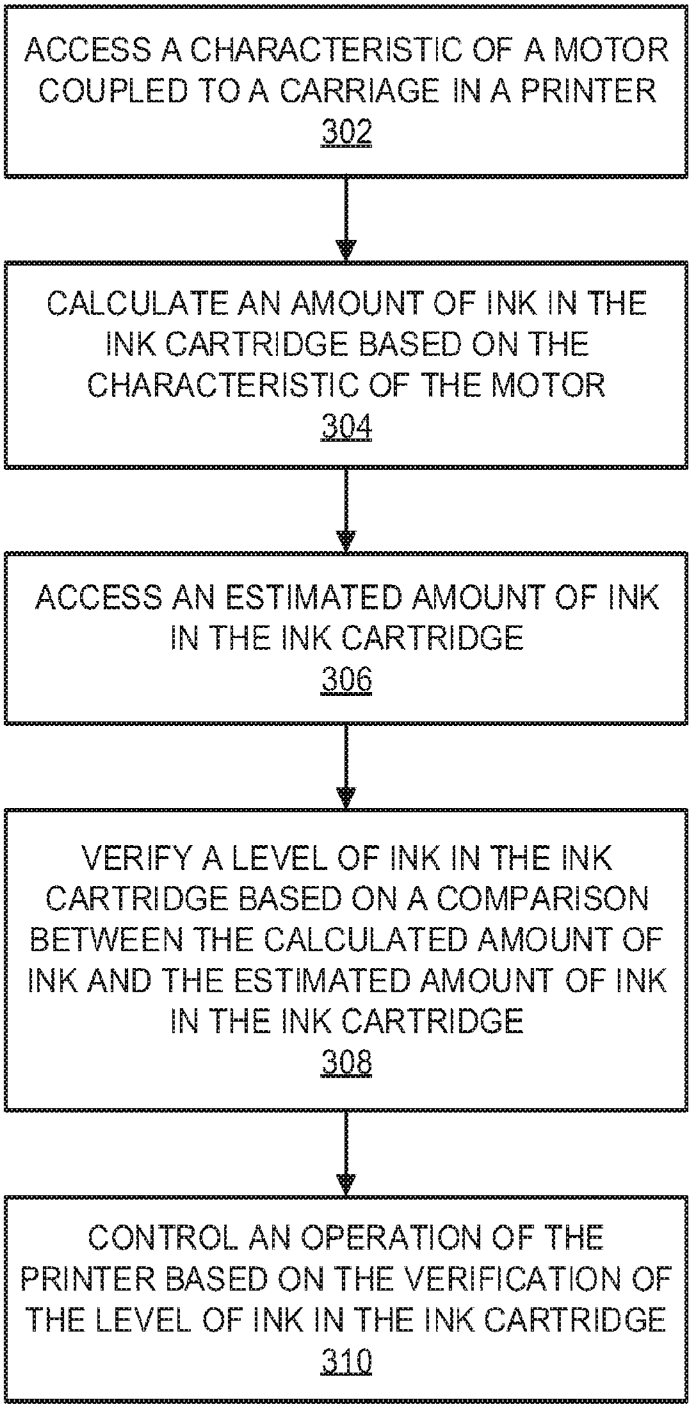
FIG. 3 shows a flow diagram of an example method for calculating an amount of ink in an ink cartridge based on a characteristic of a motor and verifying an amount of ink in the ink cartridge based on the calculated amount of ink and an estimated amount of ink.

Various manners in which the processor 102 may operate are discussed in greater detail with respect to the method 300 depicted in FIG. 3. FIG. 3 depicts a flow diagram of an example method 300 for calculating an amount of ink 210 in an ink cartridge 208 based on a characteristic 202 of a motor 204 and verifying an amount of ink 210 in the ink cartridge 208 based on a comparison between the calculated amount of ink 210 and an estimated amount of ink 228. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may access a characteristic 202 of a motor 204 coupled to a carriage 206 in a printer. In some examples, the carriage 206 may support an ink cartridge 208 such that the motor 204 may control movement of the ink cartridge 208 in the printer. The characteristic 202 of the motor 204 may be a characteristic during movement of the carriage 206 by the motor 204.

At block 304, the processor 102 may calculate an amount of ink 210 in the ink cartridge 208 based on the accessed characteristic 202 of the motor 204. In some examples, the processor 102 may calculate a weight 222 of the ink cartridge 208 based on the accessed characteristic 202 of the motor 204. In this regard, the processor 102 may calculate the weight 222 of the ink cartridge 208 based on a difference between a calculated weight 224 of the carriage 206 with the ink cartridge 208 and a calculated weight 226 of the carriage 206 without the ink cartridge 208. As such, the processor 102 may calculate the amount of ink 210 in the ink cartridge 208 based on the calculated weight 222 of the ink cartridge 208.

In some examples, the processor 102 may access a motor voltage 212 and a motor speed 214 respectively depicted in FIG. 2, during movement of the carriage 206 by the motor 204. The processor 102 may calculate a motor torque (Trq) based on the motor voltage level 212 and the motor speed 214, and based on the calculated motor torque (Trq), the processor 102 may calculate the weight 224 of the carriage 206 with the ink cartridge 208 based on the determined motor torque resulting from movement of the carriage 206 with the ink cartridge 208.

At block 306, the processor 102 may access an estimated amount of ink 228 in the ink cartridge 208. In some examples, the processor 102 may determine a number of drops fired from the ink cartridge 208 from a certain point, for instance, from a point at which the ink cartridge 208 is full. In this instance, the processor 102 may determine the estimated amount of ink 228 in the ink cartridge 208 based on the determined number of drops fired from the ink cartridge 208 from the certain point and a predetermined capacity of the ink cartridge 208.

In some examples, the processor 102 may estimate a weight of ink in the ink cartridge 208 based on a difference between a predetermined initial weight of ink in the ink cartridge 208 and a weight of the number of drops of ink fired from the ink cartridge 208. In addition, the processor 102 may determine the estimated amount of ink 228 in the ink cartridge 208 based on the estimated weight of ink in the ink cartridge 208.

At block 308, the processor 102 may verify that the estimated level of ink in the ink cartridge 208 is accurate based on a comparison between the calculated amount of ink 210 and the estimated amount of ink 228 in the ink cartridge 208. In some examples, the processor 102 may verify that the estimated amount of ink 228 is accurate based on a determination that the estimated amount of ink 228 is within a predetermined range of the calculated amount of ink 210, which is calculated based on the characteristic 202 of the motor 204.

At block 310, the processor 102 may control an operation of the printer based on the verification of the level of ink in the ink cartridge 208. In some examples, based on a determination that the calculated amount of ink 210 in the ink cartridge 208 does not correspond to the estimated amount of ink 228, the processor 102 may disable the printer and/or generate a notification.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
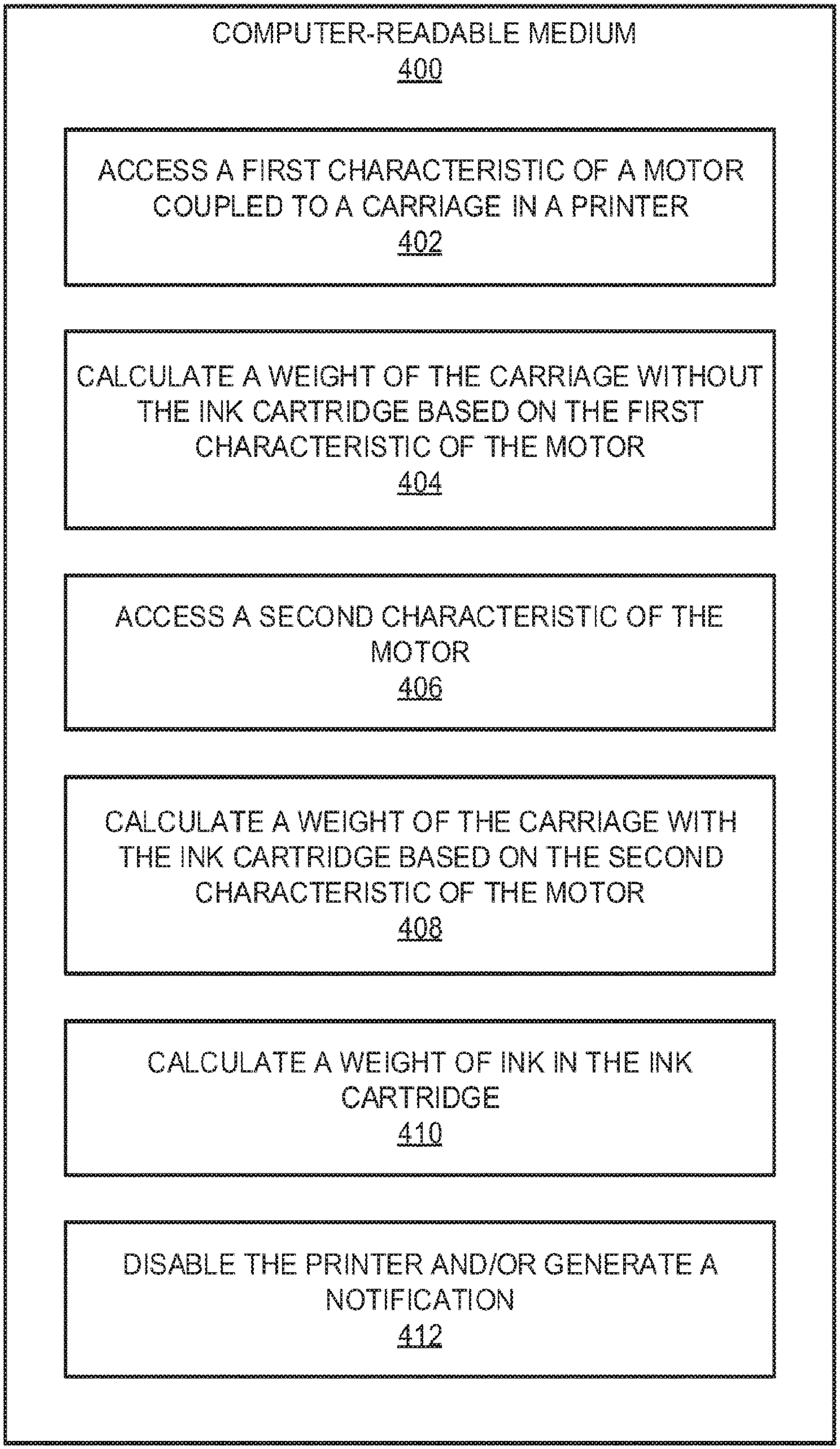
FIG. 4 depicts a block diagram of an example non-transitory computer-readable medium that may have stored thereon computer-readable instructions to calculate a weight of ink in an ink cartridge based on characteristics of a motor during movement of the carriage by the motor.

Turning now to FIG. 4, there is shown a block diagram of a non-transitory computer-readable medium 400 that may have stored thereon computer-readable instructions to calculate a weight of ink in an ink cartridge 208 based on characteristics 202 of a motor 204 during movement of the carriage 206 by the motor 204. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium. The term "non-transitory" does not encompass transitory propagating signals.

The computer-readable medium 400 may have stored thereon computer-readable instructions 402-412 that a processor, such as the processor 102 depicted in FIGS. 1-2, may execute. The computer-readable medium 400 may be an electronic, magnetic, optical, or other physical storage device that contains or stores executable instructions. The computer-readable medium 400 may be, for example, Random-Access memory (RAM), an Electrically Erasable Programmable Read-Only Memory (EEPROM), a storage device, an optical disc, or the like.

The processor may fetch, decode, and execute the instructions 402 to access a first characteristic of a motor 204, such as the characteristic 202 depicted in FIG. 2, coupled to a carriage 206 in a printer. In some examples, the carriage 206 may support an ink cartridge 208. The first characteristic 202 may be a characteristic of the motor 204 during movement of the carriage 206 without the ink cartridge 208 by the motor 204.

The processor may fetch, decode, and execute the instructions 404 to calculate a weight 226 of the carriage 206 without the ink cartridge based on the first characteristic 202 of the motor 204. In some examples, the weight 226 of the carriage 206 without the ink cartridge 208 may be a calibrated weight of the carriage 206 that is measured and stored in the memory 110 during an initial calibration process.

The processor may fetch, decode, and execute the instructions 406 to access a second characteristic of the motor 204, such as the characteristic 202 depicted in FIG. 2. The second characteristic 202 may be a characteristic of the motor 204 during movement of the carriage 206 with the ink cartridge 208 by the motor 204. In some examples, the second characteristic 202 may be a characteristic of the motor 204 obtained, for instance, at periodic intervals and based on a changing weight 224 of the carriage 206 due to falling levels of ink in the ink cartridge 208.

The processor may fetch, decode, and execute the instructions 408 to calculate a weight 224 of the carriage 206 with the ink cartridge 208 based on the second characteristic 202 of the motor 204. In this regard, the calculated weight 224 of the carriage 206 may reflect a changing weight of the carriage 206 caused by falling levels of ink in the ink cartridge 208.

The processor may fetch, decode, and execute the instructions 410 to calculate a weight of ink in the ink cartridge 208 based on a difference between the weight 226 of the carriage 206 without the ink cartridge 208 and the weight 224 of the carriage 206 with the ink cartridge 208. In some examples, the processor may calculate the amount of ink 210 in the ink cartridge 208 based on the calculated weight of ink in the ink cartridge 208.

The processor may fetch, decode, and execute the instructions 412 to disable the printer and/or generate a notification based on a determination that the calculated weight of ink in the ink cartridge is outside a predetermined range. In this regard, the calculated weight of ink may be similar to the calculated amount of ink 210 depicted in FIG. 2. In some examples, the processor 102 may determine that the weight of ink in the ink cartridge 208 is outside the predetermined range based on a comparison to an estimation of an amount of ink expected in the ink cartridge 208.

In some examples, the processor 102 may access an estimated weight of ink in the ink cartridge 208. In some examples, the estimated weight of ink may be similar to the estimated amount of ink 228 depicted in FIG. 2. The estimated weight of ink may be based on a number of drops fired from the ink cartridge 208 from a certain point, for instance, a full state. In some examples, the processor 102 may compare the estimated weight of ink against the calculated weight of ink in the ink cartridge 208. The processor 102 may disable the printer and/or generate the notification based on a determination that the estimated weight of ink differs from the calculated weight of ink by a predetermined amount.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:

a processor; and a memory on which are stored computer-readable instructions that when executed by the processor, cause the processor to:

access a characteristic of a motor coupled to a carriage in a printer, an ink cartridge being mounted on the carriage, and the characteristic of the motor is measured during movement by the motor of the carriage;

calculate an amount of ink in the ink cartridge based on the characteristic of the motor;

determine whether the calculated amount of ink differs from an estimated amount of ink in the ink cartridge; and based on the calculated amount of ink in the ink cartridge differing from the estimated amount of ink in the ink cartridge, generate a notification.

2. The apparatus of claim 1, wherein the instructions cause the processor to:

calculate the amount of ink in the ink cartridge based on a difference between a calculated weight of the carriage with the ink cartridge and a calculated weight of the carriage without the ink cartridge.

3. The apparatus of claim 2, wherein the instructions cause the processor to:

access the characteristic of the motor, the characteristic including a motor voltage and a motor speed during movement by the motor of the carriage;

determine a motor torque based on the motor voltage and the motor speed; and calculate the weight of the carriage with the ink cartridge based on the determined motor torque resulting from movement of the carriage with the ink cartridge and resulting from movement of the carriage without the ink cartridge.

4. The apparatus of claim 1, wherein the instructions cause the processor to:

determine a weight of the ink cartridge based on the accessed characteristic of the motor; and calculate the amount of ink in the ink cartridge based on the determined weight of the ink cartridge.

5. The apparatus of claim 1, wherein the characteristic of the motor includes a motor voltage level, a motor speed, a motor current, a motor torque constant, and/or a motor resistance measured during movement by the motor of the carriage.

6. The apparatus of claim 1, wherein the instructions cause the processor to:

access the estimated amount of ink in the ink cartridge, the estimated amount of ink being based on a number of drops fired from the ink cartridge from a certain point; and determine whether the calculated amount of ink differs from the estimated amount based on a comparison of the calculated amount of ink against the estimated amount of ink in the ink cartridge.

7. The apparatus of claim 1, wherein the instructions cause the processor to:

calculate a weight of the carriage without the ink cartridge based on the characteristic of the motor;

periodically calculate a weight of the carriage with the ink cartridge based on the characteristic of the motor;

periodically calculate the amount of ink in the ink cartridge based on a difference between the calculated weight of the carriage without the ink cartridge and the periodically calculated weight of the carriage with the ink cartridge; and compare the calculated amount of ink in the ink cartridge with the estimated amount of ink in the ink cartridge.

8. A method comprising:

accessing, by a processor, a characteristic of a motor coupled to a carriage in a printer, the carriage supporting an ink cartridge, and the characteristic of the motor is measured during movement of the carriage by the motor;

calculating, by the processor, an amount of ink in the ink cartridge based on the characteristic of the motor;

accessing, by the processor, an estimated amount of ink in the ink cartridge;

verifying, by the processor, a level of ink in the ink cartridge based on a comparison between the calculated amount of ink and the estimated amount of ink in the ink cartridge; and controlling, by the processor, an operation of the printer based on the verification of the level of ink in the ink cartridge.

9. The method of claim 8, further comprising:

calculating a weight of the ink cartridge based on a difference between a calculated weight of the carriage with the ink cartridge and a calculated weight of the carriage without the ink cartridge; and calculating the amount of ink in the ink cartridge based on the calculated weight of the ink cartridge.

10. The method of claim 9, further comprising:

accessing a motor voltage and a motor speed during movement of the carriage by the motor;

calculate a motor torque based on the motor voltage and the motor speed; and calculating the weight of the carriage with the ink cartridge based on the calculated motor torque resulting from movement of the carriage with the ink cartridge.

11. The method of claim 8, further comprising:

calculating a weight of the ink cartridge based on the accessed characteristic of the motor; and calculating the amount of ink in the ink cartridge based on the calculated weight of the ink cartridge.

12. The method of claim 8, further comprising:

determining a number of drops fired from the ink cartridge from a certain point;

determining the estimated amount of ink in the ink cartridge based on the determined number of drops fired from the ink cartridge from the certain point and a predetermined capacity of the ink cartridge; and based on a determination that the calculated amount of ink in the ink cartridge does not correspond to the estimated amount of ink, disabling the printer and/or generating a notification.

13. The method of claim 8, further comprising:

estimating a weight of ink in the ink cartridge based on a difference between a predetermined initial weight of ink in the cartridge and a weight of a number of drops of ink fired from the ink cartridge, wherein the estimated amount of ink in the ink cartridge is based on the estimated weight of ink in the ink cartridge.

14. A non-transitory computer readable medium on which is stored computer-readable instructions that, when executed by a processor, cause the processor to:

access a first characteristic of a motor coupled to a carriage in a printer, the carriage to support an ink cartridge, the first characteristic of the motor is measured during movement of the carriage without the ink cartridge by the motor;

calculate a weight of the carriage without the ink cartridge based on the first characteristic of the motor;

access a second characteristic of the motor, the second characteristic of the motor is measured during movement of the carriage with the ink cartridge by the motor;

calculate a weight of the carriage with the ink cartridge based on the second characteristic of the motor;

calculate a weight of ink in the ink cartridge based on a difference between the weight of the carriage without the ink cartridge and the weight of the carriage with the ink cartridge; and based on a determination that the calculated weight of ink in the ink cartridge is outside a predetermined range, generate a notification.

15. The non-transitory computer readable medium of claim 14, wherein the instructions cause the processor to:

access an estimated weight of ink in the ink cartridge, the estimated weight of ink being based on a number of drops fired from the ink cartridge from a certain point;

compare the estimated weight of ink against the calculated weight of ink in the ink cartridge; and disable the printer and/or generate the notification based on a determination that the estimated weight of ink differs from the calculated weight of ink by a predetermined amount.

16. The apparatus of claim 1, wherein the instructions cause the processor to calculate a real-time value of the amount of ink in the ink cartridge based on the characteristic of the motor.

17. The apparatus of claim 1, wherein the instructions cause the processor to determine that the ink cartridge has been tampered with based on the amount of ink in the ink cartridge differing from the estimated amount of ink in the ink cartridge by a predetermined amount.

* * * * *